United States Patent [19]

Pidgeon

[11] Patent Number: 4,968,189

[45] Date of Patent: Nov. 6, 1990

[54] HOLE SAW DRIVER-EXTRUDER AND HOLE ENLARGER

[76] Inventor: Joseph A. Pidgeon, 2920 N. Deer Track Rd., Tucson, Ariz. 85749

[21] Appl. No.: 426,060

[22] Filed: Oct. 20, 1989

[51] Int. Cl.$^5$ .................. B23B 35/00; B23B 51/05
[52] U.S. Cl. ..................... 408/1 R; 408/80; 408/204; 408/209
[58] Field of Search ............ 408/1 R, 81, 82, 204, 408/206, 207, 209, 79, 80

[56] References Cited

U.S. PATENT DOCUMENTS

| | | | |
|---|---|---|---|
| 3,784,316 | 1/1974 | Bittern | 408/204 |
| 4,036,560 | 7/1977 | Clark et al. | 408/204 |
| 4,148,593 | 4/1979 | Clark | 408/204 |
| 4,749,315 | 6/1988 | Mills | 408/209 |

FOREIGN PATENT DOCUMENTS 163006 10/1982 Japan ..................... 408/209

*Primary Examiner*—Daniel W. Howell

[57] ABSTRACT

A device is disclosed for driving conventional hole saws and for extruding sawed material from within said saws after sawing. An internally right hand threaded shank is attached to the outer base end of a conventional hole saw. A cooperating mandrel is threaded into the shank from within the hole saw. The end of the mandrel remaining in the hole saw forms wing-like projections which spiral into the hole saw as the mandrel is threaded into the shank. A sleeve freely mounted on the shank contains pins which protrude into the saw through complimentary holes provided in the base of the conventional hole saw to obstruct the spiral motion of the mandrel projections to transfer torque from the mandrel to the saw for sawing, and the sleeve is moved away from the hole saw on the shank, withdrawing the pins from within the saw to free the mandrel to thread out through the saw to extrude sawed contents therefrom. In an altered mode, a supplementary mandrel is secured in the end of the first mandrel for retaining a second saw in the first saw to pilot the first saw into a hole to be enlarged and to stabilize the first saw concentrically around the hole to a saw a concentric enlargement thereof.

5 Claims, 3 Drawing Sheets

HOLE SAW DRIVER-EXTRUDER AND HOLE ENLARGER

FIELD OF INVENTION

This invention relates to a device for driving hole saws to saw holes and to concentrically enlarge existing holes, and for extruding sawed residue from within the saws after sawing or enlarging holes.

More specifically the invention relates to a device for driving conventional hole saws for sawing or enlarging circular holes and extruding sawed residue from within the saws without the need or use of extraneous tools or a reversible driving drill motor.

PRIOR ART

Rotary hole saws comprise a thin-walled hollow cylinder having a cutting edge on the open lip of one end and a base formed at the opposite end to support a mandrel. The saws are available in sizes from one inch to about six inches in diameter. All hole saws incorporate a pilot drill which extends beyond the cutting edge to locate the desired center of the hole to be sawed and to stabilize the hole saw. The pilot drill is essential for hand-held work, first entering the material to be sawed, keeping the saw from running like a wheel along the surface of the material to be sawed.

Three principle forms of hole saws utilize differently formed bases to accomodate their driving mandrels.

One form uses a mandrel integral with each hole saw.

A second form uses an oppositely truncated hole through its base and a threaded bushing having flats corresponding to the truncated sides of the hole fastened in the hole with a special nut. A pilot drill retained in the bushing by a set screw also acts as the mandrel. These saws are usually made of mild steel for light work in wood and require wrenches to fasten the bushing and nut in the truncated hole in the base.

A third most popularly used form for commercial work uses a right hand threaded hole formed axially through its base and two diametetrically opposite holes formed around the threaded hole. The saws have a base of mild steel and a sawing body of high speed steel for use in wood, non-ferrous metals and thin sheet steel.

The center holes of this latter described form are made by an extruding process which forms a shallow cylindrical wall to support internal threads to which a mandrel is threaded. The depth to which the metal of the base may be drawn by the extrusion process is very limited with the result that only about three full threads may be formed in the extruded wall even though fine threads are used (five-eighths inch diameter and eighteen threads per inch is the standard). The driving mandrel for these saws has a short threaded stub on one end for engaging the threads in the saw base extrusion and a next adjacent wide flange which contains two movable pins that can be aligned with and pushed into the diametrically opposite holes in the base of the hole saw so that the torque of sawing is tranferred from the mandrel pins to holes in the saw rather than from the threaded stub of the mandrel to the threads of the extruded hole.

The resulting problem is that the pins in the mandrel flange are usually not aligned with the holes in the saw base at the same time that the flange is drawn against the saw base by the cooperating threads of the mandrel and saw base, which would be the ideal condition. In practice then, this ideal condition occurs only coincidentally with the result that the pins are aligned with the holes in the saw base when the flange is not against the saw base such that the saw can wobble loosely on the mandrel and such that the few threads of the mandrel and the saw base receive the full thrust force of sawing instead of that force being ideally applied by the mandrel flange against the base of the hole saw. While the thrust force of sawing is not great in hand-held work it can be very great when the saws are used in a drill press and can cause rapid deterioration of the threads in the hole saw base.

While these hole saws provide the most efficient means for making large holes, their use is deterred because of the difficulty and the waste of time required in removing the residual sawed material from in the saws after sawing, The disks of sawed material are impaled on the pilot drill and tightly confined between the walls of the saws. The only means provided for removing the material being holes in the base end of the saws or slots in the sides of the saws through which any available tools may be used to pry the sawed contents free, a wasteful procedure which is complicated because the saws are often too hot to manipulate manually because of the friction of sawing.

None of the fore-described driving mandrel provide any means for removing sawed material from within the saws after sawing, otherwise.

A more recently disclosed specially constructed hole saw and mandrel combination offers a means for removing sawed material from the saws mechanically. A left hand threaded hole in the saw base cooperates with a left hand threaded mandrel which is threaded into the saw base from within the hole saw, a flange on the mandrel being screwed tightly against the inside of the saw base. The threads in the saw base and on the mandrel are exceedingly fine (twenty-six threads per inch being the preferred arrangement) such that the threads bind the mandrel flange against the saw base so tightly that wrench flats are required on the hole saw and on the mandrel for the purpose of loosening the mandrel flange from the saw base so that the mandrel may be driven out of the saw base in a left hand direction (counterclockwise for the operator of an electric drill) such that the flange on the mandrel removes the sawed contents from within the saw.

Two different sized wrenches adapted to the saw and the mandrel are used simultaneously to loosen the mandrel flange from the saw base. Whether a different sized wrench is required for each different sized saw is not disclosed. Presumably the saw and its driving drill must be supported on some surface when the operator's two hands are using the two wrenches which would create a problem for a workman on a ladder or on an unsheathed roof or floor. The possibility that the drill may be accidentally started while the wrenches are being applied to the saw and mandrel creates the possibilty of injury. The Federal Occupational Safety and Health Administration would probably not approve the use of that drill for commercial use without its being disconnected from its electrical source when the two wrenches are applied, which would present an additional complication for its user.

Many other very large, complicated and expensive mechanisms have been disclosed for use With stationary machinery to remove sawed contents from within hole saws, none of which are realistically applicable for use by carpenters in construction work, mechanics in sheet metal work, or for use in home workshops.

No prior art specifically for the purpose of concentrically enlarging existing holes with hand held equipment is apparent. Carpenters, sheet metal workers, duct work installers and home workshop owners are left to their own ingenuity to devise ways to enlarge existing holes concentrically because of errors or changes in specifications; as for example, if a series of standing wood or aluminum wall studs contain holes to support horizontal runs of pipes or conduits and the holes are required to be concentrically enlarged, the mechanic now has the options of using a coping saw if both sides of the studs are unsheathed, a rasp or file, or he may fashion tapered plugs with concentric lead holes to drive into the holes to guide the pilot drill of a larger saw, all of which options consume a great amount of valuable time with the accuracy of the holes wholly dependent upon the skill of the mechanic.

Thus it is the object of this invention to provide a driver, extruder and hole enlarger which has the economic virtue of utilizing conventional hole saws already in the hands of carpenters and mechanics and in workshops and stores everywhere and which obviate the need for extraneous wrenches or tools or the need to disconnect the driving drill from its electrical source each time sawed material is extruded from the saw.

SUMMARY

In the present invention an internally right hand threaded shank having a cylindrical body forms a threaded stub of smaller diameter on one end adapted to engage the short threaded extrusion formed in the bases of conventional hole saws and forms a larger diameter flange on the opposite end. The stub is threaded into the outer base end of a said hole saw with the shoulder of the cylindrical body tight against the saw base, the shank forming a rigid appendage to the saw.

A sleeve shorter than the cylindrical body of the shank is mounted on the body free to reciprocate and rotate thereon. Diametrically opposite pins are retained in the end of the sleeve toward the the shank stub projecting out from the end of the sleeve arranged that when the sleeve is moved on the shank body against the flange of the shank the pins extend into but do not pass through the standard diametrically opposite holes formed in the saw base around the threaded extrusion. It is important to recognize that the pins may be aligned with the holes in the saw base as the shank is threaded into the hole saw base and will be aligned through said holes regardless of the position of the shank when it is tightened against the saw base so that thrust applied to the shank when sawing is transmitted to the saw base rather than to the threads.

An elongated right hand threaded mandrel adapted to engage the right hand thread of the shank has an axially aligned hexagonal extension of smaller diameter than the threaded mandrel for coupling to the jaws of a power driven drill chuck and small enough to pass through the internally threaded shank. The mandrel has a wing nut permanently fixed on the opposite end, the wings of the nut extending radially from the mandrel end and toward the hexagonal extension of the mandrel. The shank of a pilot drill is retained in a hole formed axially into the wing nut end of the mandrel and is secured in the hole by a set screw threaded into a hole formed into the wing nut end of the mandrel intersecting the axial hole. The hexagonal end of the mandrel is passed through the open end of the hole saw into the stub end of the shank and the mandrel is threaded into the shank bringing the mandrel wings close to the inside surface of the saw base but not aligned with the diametrically opposite holes in the base.

The sleeve on the shank body is moved from against the shank flange against the saw base so that the pins projecting from the sleeve are moved into the cavity of the hole saw sufficiently to intersect the helical paths which the ends of the wings on the mandrel end define when the mandrel is threaded into the shank. The mandrel wings and the pins crossing the paths of the wings form the dogs of a positive clutch such that when the mandrel is rotated in a right hand direction the mandrel wings work against the sleeve pins transferring right hand rotary motion to the saw for sawing.

After sawing, a disk of sawed material is confined in the cup of the saw impaled on the pilot drill flush with the toothed end of the saw. The sleeve is moved on the shank body from against the saw base to against the shank flange, the sleeve pins being disengaged from contact with the mandrel wings the ends of the pins being retracted from the cup of the saw into the diametrically opposite holes in the saw base freeing the mandrel to be threaded out of the shank toward the toothed end of the saw causing the winged end of the mandrel to extrude the sawed disk from within the saw cup where it can easily be pulled off of the pilot drill.

To concentrically enlarge a hole and to extrude the residual annular material from within the enlarging saw, a first conventional hole saw having a diameter larger than that of the hole to be enlarged is threaded onto the shank. The pilot drill is removed from the end of the mandrel. A threaded shaft adapted to engage the threaded holes of the conventional hole saws forms a shank portion on one end thereof adapted to fit the pilot drill hole in the end of the mandrel. A washer having an outside diameter closely fitting the cup of the first hole saw is mounted closely over the shank portion of the shaft which is then secured in the pilot drill hole fastening the washer between the wing nut end of the mandrel and a shoulder which is formed at the juncture of the shaft and the shank portion thereof. A second conventional hole saw having a sawing diameter equal to the diameter of the existing hole is threaded onto the shaft the cutting end thereof passing over the shaft and against the washer and the contoured base end thereof extending concentrically out from the first saw forming a pilot to first enter the hole stabilizing the first saw concentrically around the hole to saw a concentric enlargement thereof. After sawing, the washer implements the winged end of the mandrel to extrude the annular material confined between the saws from within the first saw after which it may be easily removed from the second saw. The second saw may, of course, be threaded onto the shaft with the base end thereof against the washer and sawing end extending out to form the pilot, but with the risk that if the driving tool is not held exactly perpendicular to the hole, the saw may cut laterally into the hole destroying its integrity and producing a larger hole not concentric therewith.

A spring coil retained in an annular slot formed in the outer wall of the shank expamds into one or more detent grooves formed in the inner wall of the sleeve to stabilize the sleeve on the shank in the correct positions to facilitate the functions of sawing and extruding.

DESCRIPTION OF THE DRAWINGS

Referring to FIG. 1, the device of the invention is comprised of three principle parts: a shank 1, adapted to interlock with the base 7 of a conventional hole saw, a movable sleeve 2 supported on shank 1 retaining pins 3 and 3a for cooperating with corresponding holes 9 and 9a in saw base 7 and mandrel 16 which forms wings 20 and 20a to cooperate with pins 3 and 3a in sleeve 2.

Figure 1:
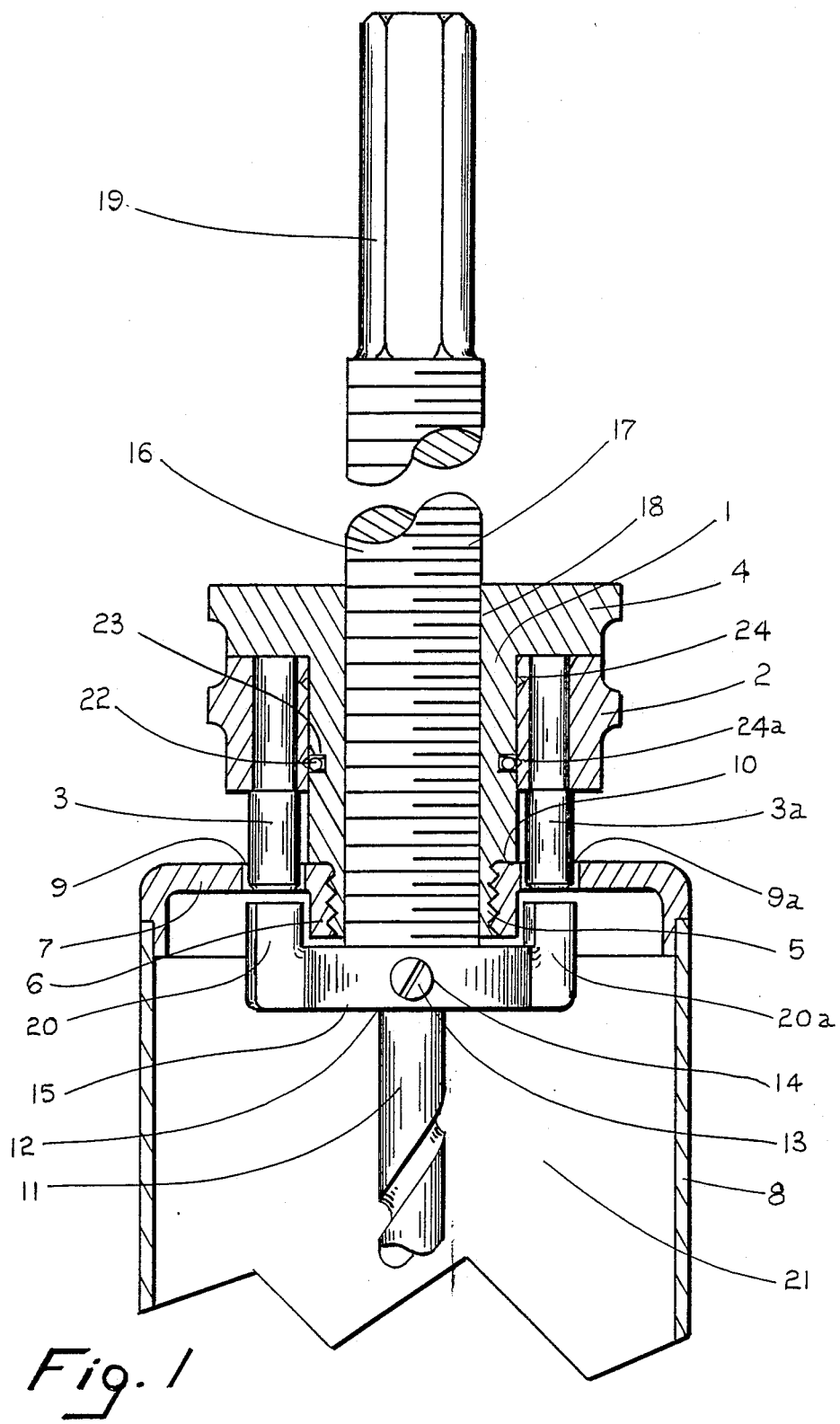
FIG. 1 is a partially sectional view of the assembled components of the invention in the mode for extruding sawed material from the conventional hole saw to which the device is attached.

Sleeve 2 is placed on shank 1 against flange 4 with the diametrically opposite pins 3 and 3a retained therein extending toward threaded stub 5 of shank 1. Threaded stub 5 is started into threaded extrusion 6 formed in base 7 of hole saw 8 and sleeve 2 is rotated on shank 1 to align pins 3 and 3a with holes 9 and 9a in saw base 7. Stub 5 is then threaded fully into extrusion 6 bringing radial shoulder 10 of shank 1 tightly against saw base 7 moving pins 3 and 3a into but not through holes 9 and 9a in saw base 7.

Mandrel 16 forms hexagonal extension 19 for coupling to a drill chuck, right hand threads 17 adapted to engage right hand threaded hole 18 formed axially through shank 1 and has a wing nut 15 permanently fixed flush on the threaded end (not shown) of mandrel 16 the wings 20 and 20a extending radially from mandrel 16 toward hexagonal extension 19. A pilot drill hole 12 (indicated but not shown) is formed axially into the wing nut end of mandrel 16 retaining pilot drill 11 which is secured by set screw 13 in radially disposed threaded hole 14 through wing nut 15 and mandrel 16. Hexagonal shank extension 19 of mandrel 16 is inserted through cup 21 of saw 8 and threaded hole 18 in shank 1 and mandrel 16 is threaded into shank 1 bringing wings 20 and 20a close to saw base 7 but not in alignment with holes 9 and 9a therein.

Figure 2:
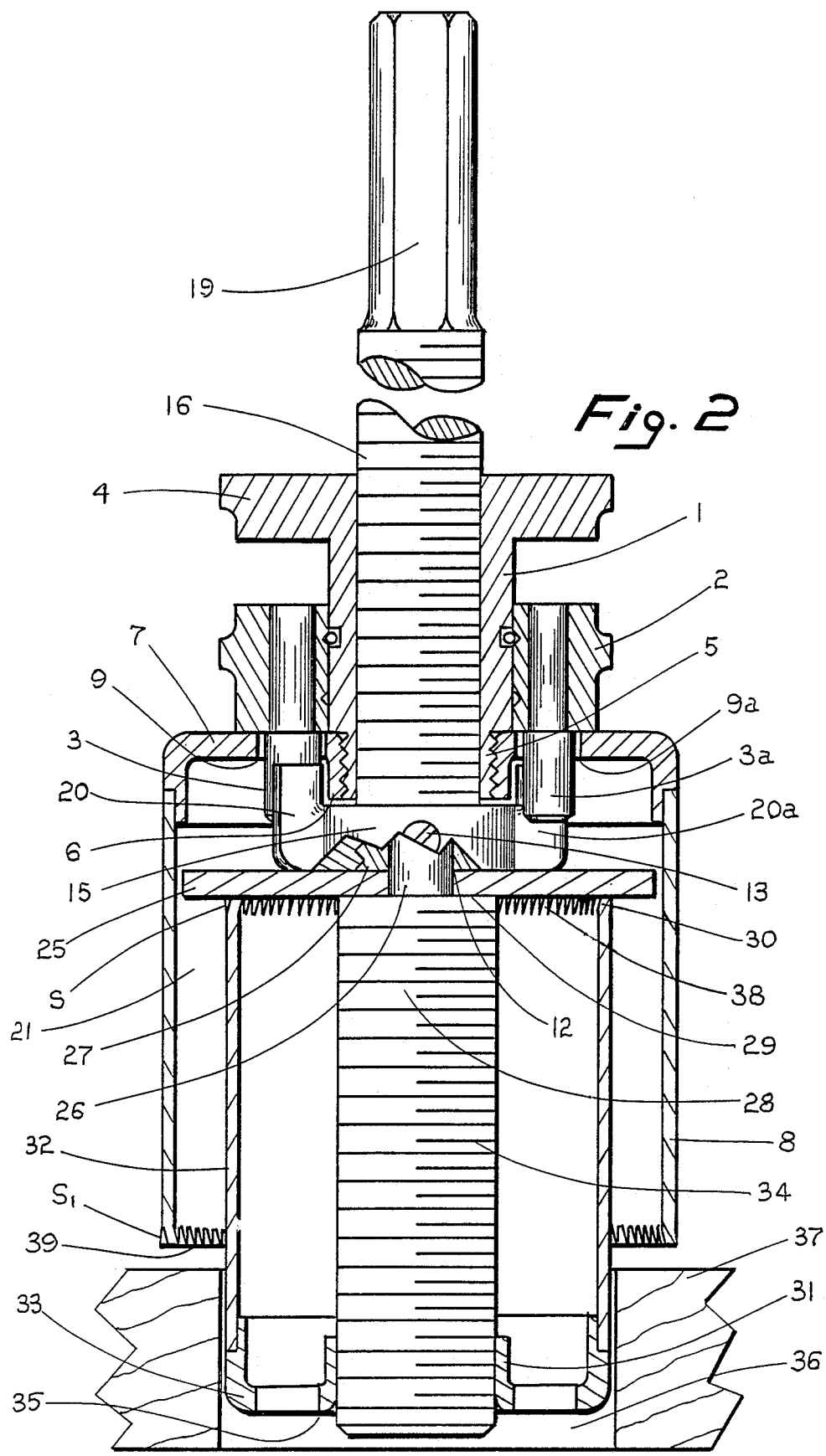
FIG. 2 is a partially sectional view of the assembled device arranged for enlarging holes and extruding annular sawed contents therefrom.

For sawing, sleeve 2 is moved on shank 1 against saw base 7 moving pins 3 and 3a into cup 21 of saw 8 blocking right hand rotation of nut wings 20 and 20a relative to saw base 7, pins 3 and 3a and wings 20 and 20a forming opposing dogs of a positive clutch transferring right hand rotary motion, as from a power drill, from mandrel 16 to saw 8 (FIG. 2). After sawing, sleeve 2 is moved against flange 4 of shank 1 disengaging pins 3 and 3a from contact with wings 20 and 20a freeing mandrel 16 to be threaded in right hand direction through shank 1 moving wing nut 15 out through cup 21 of saw 8 to extrude sawed contents therefrom and allowing them to be easily removed from the pilot drill. A ring spring 22, having a free diameter larger than the diameter of shank 1 is compressed into annular slot 23 in the outer cylindrical surface of shank 1 by sleeve 2 and spring 22 expands into detent grooves 24 and 24a in the inner cylindrical surface of sleeve 2 to stabilize sleeve 2 on shank 1 in optimum positions for sawing and extruding.

Referring to FIG. 2, showing the device arranged for concentrically enlarging holes, pilot drill 11 (shown in FIG. 1) is removed from mandrel 16. Shaft 28 forms threads 31 adapted to engage the uniform threaded extrusions in the bases of conventional hole saws and forms a shank portion 26 on one end adapted to fit the pilot drill hole 12 in mandrel 16. A flat washer 25 closely fitting the cup 21 of hole saw 8 is mounted closely over shank portion 26 of shaft 28 and shank portion 26 is inserted in pilot drill hole 12 in mandrel 16 and secured therein by setscrew 13, fastening washer 25 on shank portion 26 between end 27 of mandrel 16 together with wing nut 15 and radial shoulder 29 formed at the juncture of shaft 28 and its shank portion 26. Cutting end 30 of hole saw 32 is placed over shaft 28 and extrusion 31 in base 33 of saw 32 is threaded onto shaft 28 tightening sawing end 30 of saw 32 against washer 25. Washer 25 is preferably made of aluminum or durable plastic that will not dull the saw teeth 38. Hole saw 32 is of a chosen diameter equal to that of circular hole 36 in workpiece 37. Sleeve 2 is placed on shank 1 and threaded stub 5 of shank 1 is threaded into extrusion 6 in base 7 of hole saw 8. Hole saw 8 has a chosen diameter larger than that of hole 36. Mandrel 16 with washer 25, shaft 28 and hole saw 32 assembled thereto is threaded into shank 1 from within cup 21 of saw 8 bringing nut wings 20 and 20a close to saw base 7 but not aligned with holes 9 and 9a therein. Sleeve 2 is then moved on shank 1 against saw base 7 moving pins 3 and 3a into cup 21 of saw 8 in position to block right hand helical motion of nut wings 20 and 20a such that right hand rotation of mandrel 16 causes nut wings 20 and 20a to impinge upon pins 3 and 3a transferring right hand rotary motion from mandrel 16 to saw 8 for sawing. Saws 8 and 32 being of equal lengths, are separated longitudinally by wing nut 15 and washer 25 such that base end 35 of saw 32 extends concentrically out from cup 21 of saw 8 forming a pilot to first enter hole 36 for stabilizing hole saw 8 concentrically around hole 36 to saw a concentric enlargement thereof. After sawing, sleeve 2 is moved against flange 4 of shank 1 extracting pins 3 and 3a from cup 21 of saw 8 and freeing wings 20 and 20a to rotate in right hand helical direction permitting mandrel 16 to thread into shank 1 to move wing nut 15 out through cup 21 of saw 8, washer 25 implementing wing nut 15 to extrude annular sawed material (not shown) from within hole saw 8 after which the sawed material may be easily removed from saw 32. The body diameters of hole saws are customarily slightly smaller than their sawing diameters due to a slight "set" (angle) given alternately inward and outward to the teeth 38 and 39 of saws 8 and 32 as shown at S and $S_1$ respectively, to prevent the saw bodies from binding in the holes and to allow a small space for sawdust to escape. For that reason base 33 of saw 32 fits hole 36 with a small clearance (not numbered) to easily enter hole 36 without undue friction or resistance. It will be obvious that saw 32 may be reversed on shaft 28 with cutting end 30 forming the pilot, but with the need then for the driving drill to be kept exactly perpendicular to work piece 37 to prevent saw 32 from sawing angularly and laterally into a side of hole 36 and leading hole saw 8 to saw a hole not concentric with hole 36.

Figure 3:
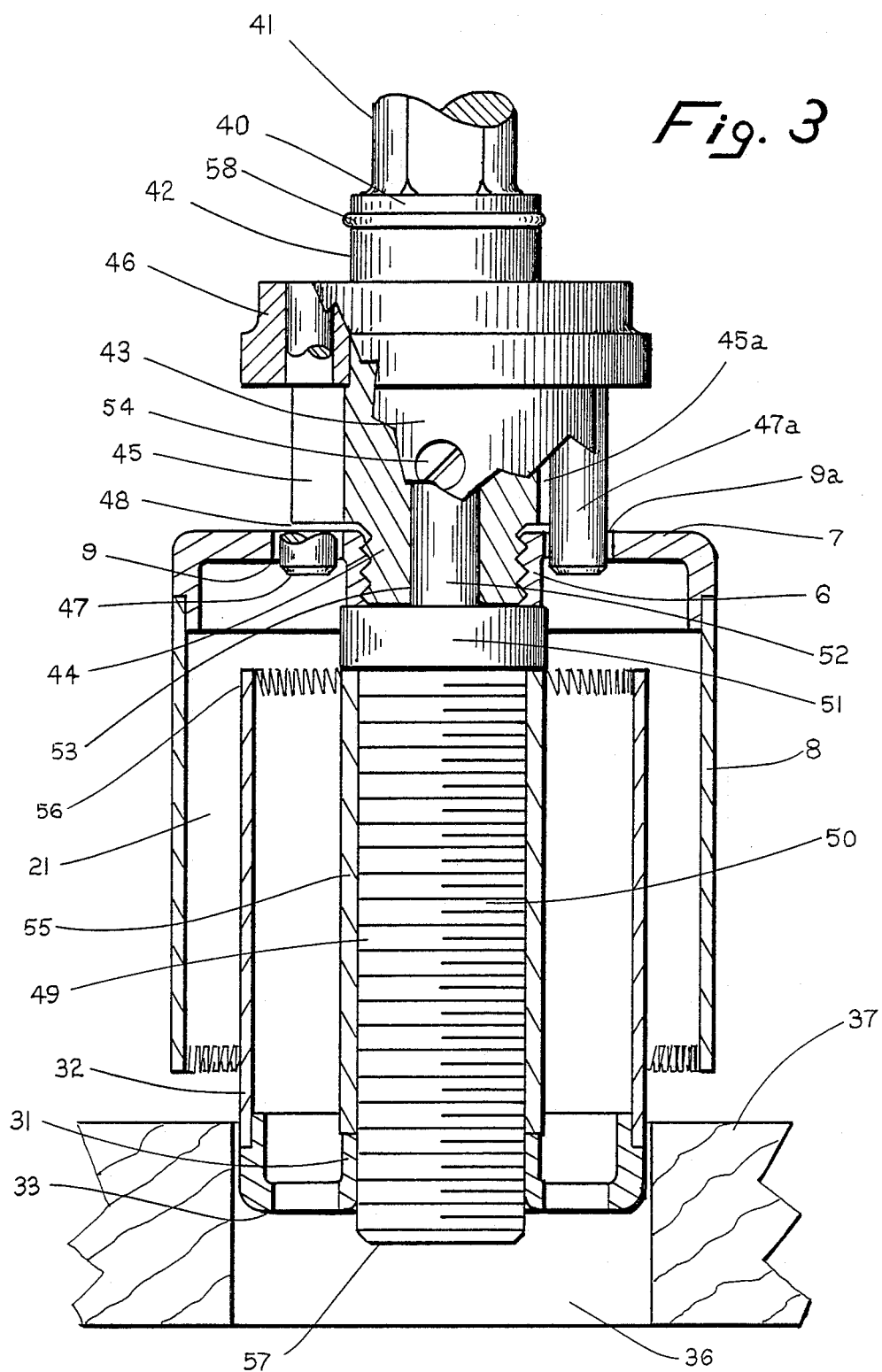
FIG. 3 is a partially sectional view of the hole enlarging device adapted to a conventional hole saw and mandrel combination.

FIG. 3 illustrates a conventional hole saw and mandrel adapted for sawing concentric enlargements of circular holes. Referring to the characters of reference in FIG. 3, hole saw 8 has a sawing diameter larger than the diameter of a hole 36 to be concentrically enlarged and hole saw 32 has a sawing diameter equal to the diameter of the hole 36 to be enlarged, it being assumed that the existing hole 36 would have been sawed or drilled with a standard sized tool of inch, inch and fractional inch or metric size for which conventional hole saws are available. Conventional hole saw mandrel 40 forms a shank 41, a cylindrical body 42, a thick flange 43 and a threaded extension 44. Flange 43 of mandrel 40 forms diametrically opposite slots 45 and 45a. Cylindrical body 42 of mandrel 40 supports collar 46 retained thereon by retaining ring 58. Collar 46 retains diametrically opposite pins 47 and 47a adapted to fit through slots 45 and 45a in flange 43 and to fit into diametrically opposite hole 9 and 9a in base 7 of hole saw 8. Extension 44 of mandrel 40 is threaded into extrusion 6 in saw base 7 bringing flange 43 as close as possible to saw base 7 as is consistent with pins 47 and 47a being aligned with holes 9 and 9a and collar 46 is moved against flange 43 with pins 47 and 47a moved into holes 9 and 9a in saw base 7 to drive hole saw 8. A gap 48 is left between flange 43 and saw base 7, its size dependent upon how close flange 43 is brought to saw base 7 with pins 47 and 47a aligned with holes 9 and 9a in saw base 7. A supplementary mandrel 49 forms an elongated threaded body 50 adapted to engage the threaded extrusions in the bases of conventional hole saws and which is longer than the length of conventional hole saws. Threaded body 50 of supplementary mandrel 49 transitions into a flange 51 and terminates in a shank 52 adapted to fit the pilot drill holes of conventional hole saw mandrels, generally one-quarter inch in diameter. Shank 52 is inserted into pilot drill hole 53 of mandrel 40 with flange 51 against extrusion 6 of saw base 7 or against extension 44 of mandrel 40 depending upon how far extension 44 is threaded into extrusion 6 and shank 52 is secured in hole 53 with set screw 54. Spacing sleeve 55 is placed on threaded body 50 of supplementary mandrel 49 against flange 51 and the sawing end 56 of hole saw 32 is inserted into cup 21 of hole saw 8 over supplementary mandrel 49 and sleeve 55. Extrusion 31 in saw base 33 of saw 32 is threaded onto end 57 of supplementary mandrel 49 and tightened against sleeve 55 such that base 33 of hole saw 32 extends concentrically out from hole saw 8 forming a pilot for hole saw 8 and to first enter hole 36 to stabilize hole saw 8 around hole 36 for sawing a concentric enlargement of hole 36 in workpiece 37. After sawing, set screw 54 in flange 40 of mandrel 40 may be loosened to release shank 52 from pilot drill hole 53 such that the assembly of supplementary mandrel 49, sleeve 55 and hole saw 32 may be removed from hole saw 8 to provide access to the annular sawed material confined in hole saw 8 for removal.

While the construction and methods of operation of the device as illustrated and described herein are considered to be the best embodiments of the invention, it will be understood that variations in design and operation of the device and devices may be made without straining the spirit and intent of the invention.

Having thus described and illustrated my invention in such clear and concise manner that those persons skilled in the art may fully understand and practice it, that which I claim is:

1. A device for utilizing two conventional hole saws and a conventional hole saw driving mandrel to saw concentric enlargements of circular holes, comprising: a supplementary hole saw mandrel defining first and second ends, said supplementary mandrel forming an elongated threaded body at said first end adapted to engage the uniform axial threaded holes in the bases of conventional hole saws, a shank having a smaller diameter adapted to fit the uniform pilot drill holes of conventional hole saw mandrels and a flange having a greater diameter than the diameter of said threaded body intermediate said body and said shank, and a spacing sleeve closely fitting said threaded body supported on said body against said flange, said sleeve being of shorter length than the length of said threaded body; said shank of said supplementary mandrel being retained in the said pilot drill hole of a conventional hole saw mandrel and secured therein by the set screw in said conventional mandrel, and a first said conventional hole saw having a sawing diameter larger than the diameter of a hole to be enlarged being conventionally coupled to said conventional mandrel and a second smaller said conventional hole saw being coupled to said supplementary mandrel, the sawing end of said second saw being inside said first saw and the base of said second saw being spaced out from said first saw, said supplementary mandrel and spacing sleeve utilizing said second saw to form a pilot for said first saw and to first enter said hole to stabilize said first saw concentrically around said hole and utilizing said first saw to saw a concentric enlargement thereof.

2. A method of assembling a flanged supplementary hole saw mandrel adapted to engage the threaded bases of conventional hole saws in the pilot drill hole of the conventional mandrel of a first conventional hole saw and supporting a second smaller conventional hole saw on the supplementary mandrel concentrically in said first hole saw and spacing said smaller hole saw out from said first saw for fitting into a circular hole to stabilize said first saw around said hole for said first saw to saw a concentric enlargement of said hole, comprising the procedures of:

inserting the shank end of a said supplementary mandrel into the open end of a first conventional hole saw mounted on a conventional hole saw mandrel, said first saw having a sawing diameter larger than the diameter of a circular hole to be enlarged;

fitting the shank of said supplementary mandrel into the pilot drill hole of said conventional mandrel, the flange of said supplementary mandrel resting against the end of said conventional mandrel;

tightening a set screw retained in said conventional mandrel to secure said supplementary mandrel in said pilot drill hole;

placing a sleeve on said mandrel against said flange, the sleeve being shorter than the length of the mandrel extending out from the open end of said first saw;

inserting the open end of said smaller saw into the open end of said first saw over said supplementary mandrel and sleeve, said smaller saw having a sawing diameter to closely fit said hole, and;

threading the base of said smaller saw onto said supplementary mandrel against said sleeve, the said base extending out from said first saw forming a pilot to enter said hole stabilizing said first saw around said hole for sawing a concentric enlargement of said hole.

3. A device attachable to a conventional hole saw for driving the saw and for extruding sawed material from the saw after sawing, said saw being of that conventional type which provides a threaded mandrel mounting hole axially through its base and driving holes arranged around the mounting hole, said device comprising:

(A) an internally right hand threaded shank having a cylindrical body, a threaded stub of smaller diameter on one end thereof adapted to engage said mounting hole in said saw base, a radial shoulder formed at the juncture of said stub and body and a flange formed on the opposite end thereof, said stub being threaded into said mounting hole with said shoulder being brought tightly against the outer base end of said saw base for said shank to form a rigid appendage to said saw;

(B) an elongated right hand threaded mandrel adapted to engage said internally threaded shank, said mandrel having a hexagonal extension of smaller diameter on one end thereof for coupling to a drill chuck, wings formed on the opposite end thereof, said wings extending radially and a short distance toward the hexagonal end of said mandrel, the ends thereof arranged around said mandrel to conform with the arrangement of said driving holes around said mounting hole in said saw base, a hole formed axially into the winged end of said mandrel for retaining the shank of a pilot drill and a radially disposed threaded hole, intersecting said axial hole, for retaining a set screw with which to secure a drill shank when a drill is needed, said mandrel being fully threaded into said shank through the stub end thereof, the ends of said wings being brought very close to the inside face of said saw base and not aligned with said driving holes therein;

(C) a sleeve, shorter than the length of said shank body, having pins projecting from one radial face thereof arranged to simultaneously fit through said driving holes in said saw base, said sleeve being mounted on said shank body with said pins projecting toward the stub end thereof, said sleeve being free to rotate on said body for aligning said pins with said driving holes while assembling said shank and saw and free to reciprocate thereon between said saw base and said shank flange; whereby, with said sleeve being moved on said shank body to rest against said saw base, the ends of said pins thereby projecting through said driving holes sufficiently far into the cup of said saw for said pins to block rotation of said wings relative to said saw, torque may be transferred from said wings through said pins to said saw during rotation of said mandrel for sawing and, with said sleeve being moved on said shank body to rest against said flange thereon, the ends of said pins thereby being withdrawn from the cup of said saw into said driving holes, and said wings thereby being free to rotate in said saw, such that said mandrel may cooperate with said shank for the winged end of said mandrel to be threaded out through said saw to extrude sawed material therefrom.

4. The device of claim 3 further including removable means for retaining a second said conventional saw concentrically in a first larger conventional saw assembled together with said shank of said device for said second saw to form a pilot for said first to enable said first saw to concentrically enlarge a circular hole, and means for implementing said mandrel to extrude sawed material from within said first saw after sawing, said means comprising:

(A) a shaft having a threaded body adapted to engage the said mandrel mounting hole of said conventional saw base, said shaft having a shank of smaller diameter adapted to engage the pilot drill hole in said mandrel and a radial shoulder formed at the juncture of said body and shank, said shank being retained in said pilot drill hole and secured therein by a set screw retained in said radially disposed hole;

(B) a flat washer having an outside diameter closely fitting the cup of said first saw, said washer being closely mounted on said shaft shank and secured between said shaft shoulder and the winged end of said mandrel; whereby said second saw, having a sawing diameter equal to the diameter of a circular hole to be enlarged, may be threaded onto said shaft, on end of said saw resting against said washer and the opposite end thereof extending concentrically out from within said first saw to first enter said hole and to stabilize said first saw around said hole for said first saw to saw a concentric enlargement thereof, and whereby said washer forms a diametrical enlargement of the winged end of said mandrel to extrude sawed material from within said first saw after sawing the enlargement.

5. The device of claim 3 further including means for maintaining said sleeve on said shank body in said driving and extruding positions, said means comprising:

(A) an annular groove formed circumferentially into the outer cylindrical surface of said shank;

(A) an annular split spring having a free diameter slightly larger than the diameter of said shank body, said spring being retained in said annular groove;

(C) two detent grooves formed circumferentially into the inside cylindrical wall of said sleeve, said grooves being spaced apart for cooperating with said spring to nominally maintain said sleeve on said shank body in said driving and extruding positions;

whereby said sleeve, being reciprocated on said shank body, causes said spring to be compressed into said groove until said sleeve is in optimum driving or extruding position, whereupon said spring is free to expand into one of said detent grooves to maintain said sleeve in position.

* * * * *